Patented Sept. 6, 1949

2,481,278

UNITED STATES PATENT OFFICE 2,481,278

POLYOXYALKYLENE COMPOUNDS

Seaver Ames Ballard, Orinda, Rupert Clarke Morris, Berkeley, and John L. Van Winkle, San Lorenzo, Calif., assignors to Shell Development Company, San Francisco, Calif., a corporation of Delaware No Drawing. Application August 31, 1946,
Serial No. 694,417

4 Claims. (Cl. 260—615)

This invention relates to new and useful lubricating compositions and more particularly it relates to lubricants containing copolymers of trimethylene glycol or its derivatives with certain alkylene glycols, as well as the novel copolymers themselves.

It is well known that certain alkylene glycols having two hydroxyl radicals on adjacent carbon atoms may be polymerized to form viscous liquids or wax-like polymers useful to a certain extent for lubrication purposes. The products obtained have the general unit configuration

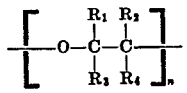

where $n$ is an integer and $R_1$ through $R_4$ are hydrogens or organic radicals such as methyl, ethyl, isopropyl, etc. Alkylene oxides having the oxygen bridging two adjacent carbon atoms form similar polymers. Examples of alkylene oxides forming such polymers are ethylene oxide, propylene oxide, butylene oxide, etc. Glycols such as ethylene glycol polymers practically identical with those obtained from the alkylene oxides. As pointed out above, these monomers and polymers have at least one part of their configuration in common: the oxygen atoms as separated by only two carbon atoms, in each case giving, in the case of polyethylene oxide polymers of the configuration:

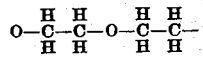

Typical of lubricants comprising the higher alkylene oxides is polypropylene oxide, having the configuration

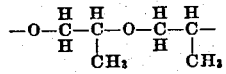

Polymers of butylene oxide and higher alkylene oxides differ in one respect from this latter configuration: the methyl substituent or one or more of the hydrogens is replaced by another hydrocarbon group (or other substituent) such as ethyl, propyl, etc. Hence, this whole series of polymers comprises chains of pairs of carbon atoms linked by oxygen atoms.

Polymers such as those of polypropylene oxide, may replace mineral oil lubricants for certain purposes, such as in hydraulic brake fluid compositions, etc. When used as engine lubricants it has two advantages over mineral oil lubricants, namely, leaving substantially no engine deposit, and having a low pour point.

However, the polyalkylene oxide and ethylene glycol polymers in general, and polypropylene oxide especially, have one serious drawback limiting their utility as general lubricants. This is the serious susceptibility of polymers consisting of units of the general configuration

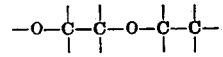

to oxidation during normal use, such as in lubricating compositions. This instability towards oxygen causes considerable loss of the product during its use, since, instead of forming gums as in the case of mineral oils, polymers of this configuration decompose upon oxidation to form volatile materials which gradually escape from the lubrication system.

This tendency to oxidize and subsequently volatilize can be controlled to a limited extent by incorporation in the polymer of certain anti-oxidants. However, large percentages of these are required to maintain suitable stability. This causes undue lacquer formation on engine parts, apparently due to the stabilizer itself. Furthermore, even in the presence of considerable proportions of anti-oxidant materials, the polymers containing a predominating number of units having the

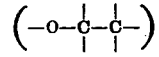

configuration continue to oxidize and volatilize to an unsatisfactory extent.

It is an object of this invention to provide polymers which do not have this disadvantageous tendency to oxidize. It is another object of this invention to provide improved non-hydrocarbon lubricants. It is a further object of this invention to provide a process for copolymerizing trimenthylene glycol or its derivatives with alkylene glycols. It is still another object of this invention to provide copolymers having units of the general configuration

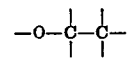

as well as units of the general configuration

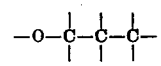

It is a fifth object of this invention to provide stable polymeric materials useful as components in plastic compositions, lubricating compositions, rubber compositions, enamels, lacquers, etc. Other objects will be obvious from the following description of the present invention.

Now, in accordance with this invention it has been found that lubricants of excellent stability are formed by copolymerization of alkylene glycols containing the essential structure

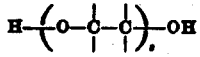

where $s$ is an integer, with trimethylene glycol or substituted trimethylene glycols of the general formula

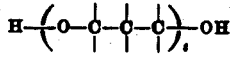

where $t$ is an integer. The polymers so formed consist essentially of chains having units of the general structure

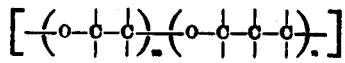

wherein $m$ and $n$ are integers, the free carbon valences carrying hydrogens or organic substituents.

The glycols which are polymerized with the trimethylene glycols to form the lubricating compositions of the present invention are generally called alkylene glycols and may be monomeric glycols or a lower polymer thereof. These glycols have the general formula

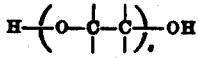

wherein $s$ is an integer and the free carbon valences are satisfied with hydrogens or organic radicals. Preferably $s$ is a number from 1 to 10, and still more preferably from 1 to 4. While the carbon constituents may be hydrogen or any organic radical, it is preferred that each

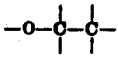

group have at least 2 hydrogen substituents the balance being aliphatic hydrocarbon radicals. When $s$ is 1, such glycols include ethylene glycol, propylene glycol, butylene glycol, etc. When $s$ is more than 1, the glycols include diethylene glycol, triethylene glycol, tetraethylene glycol, pentaethylene glycol, and the corresponding propylene, butylene, etc. glycols. When $s$ is more than 1, mixed glycols useful in the present invention include ethylene propylene glycol, diethylene propylene glycol, diethylene dipropylene glycol, etc. as well as their substituted derivatives, and polymerizable homologs and analogs.

The glycols having the general formula

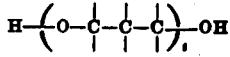

wherein $t$ is an integer and the unsatisfied carbon valences carry hydrogen or organic substituents, are all derived theoretically from trimethylene glycol. Hence, glycols of the above configuration will be referred to herein as the trimethylene glycols. When $t$ is 1, the trimethylene glycols have the general formula

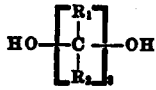

The monomeric trimethylene glycols having the above general formula are derived from trimethylene glycol. Preferably, $R_1$ and $R_2$ are hydrogens. In such case, the polymers are formed from trimethylene glycol itself. If $R_1$ and/or $R_2$ are not hydrogens, they may be organic radicals such as alkyl, aralkyl, aryl, etc. Preferably if they are not hydrogens, they are hydrocarbon radicals, especially saturated lower hydrocarbon radicals, but may also be groups which contain olefinic or acetylenic portions. Typical of the trimethylene alkyl substituted glycols are the methylated trimethylene glycols, including 1-methylpropanediol-1,3; 2-methylpropanediol-1,3; 1,1-dimethylpropanediol-1,3; 1,2-dimethylpropanediol-1,3; 1,3-dimethylpropanediol-1,3; 2,2-dimethylpropanediol-1,3; 1,1,2-trimethylpropanediol-1,3; 1,1,3-trimethylpropanediol-1,3; 1,2,2-trimethylpropanediol-1,3; 1,2,3-trimethylpropanediol - 1,3; 1,1,2,2-tetramethylpropanediol-1,3; 1,1,3,3-tetramethylpropane-1,3; 1,2,3,3 - tetramethylpropanediol - 1,3; 1,1,2,2,3-pentamethylpropanediol - 1,3; 1,1,2,3,3 - pentamethylpropanediol - 1,3; and hexamethylpropanediol-1,3.

In place of the methyl groups other alkyl groups may be utilized, such as ethyl, propyl, butyl, amyl, hexyl, heptyl, octyl, nonyl, decyl, etc., radicals, as well as their isomers. Preferably, when alkyl groups are the substituents $R_1$ and $R_2$, they have from 1 to 10 carbon atoms, and still more preferably from 1 to 5. It will be understood that $R_1$ and $R_2$ may be similar or dissimilar groups. Thus, when expanding the general formula given hereinbefore to its indicated number of carbon atoms, it then becomes

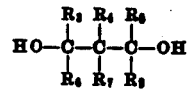

wherein $R_3$ through $R_8$ are either hydrogen atoms or similar or dissimilar organic radicals. Those derivatives of trimethylene glycol, other than trimethylene glycol itself, which give the most satisfactory copolymers for general use have either one or two of the R's as lower alkyl groups. Thus, 2-methylpropanediol-1,3 and 2,2-dimethylpropanediol-1,3 form excellent copolymers when treated according to the method of the present invention.

Other lower alkyl-substituted trimethylene glycols which polymerize readily are 1-methyl-2-ethylpropanediol-1,3; 2-methyl-2-ethylpropanediol-1,3; 1-methyl-3-ethylpropanediol - 1,3; 2-methyl-2-propylpropanediol-1,3; 1-methyl-2-isopropylpropanediol - 1,3; 2 - methyl-2-butylpropanediol-1,3; 2-methyl-3-butylpropanediol-1,3; and the homologs, analogs and derivatives of the same.

One or more of the substituents may be cycloaliphatic radicals. Thus, $R_3$ through $R_8$ may be such radicals as cyclohexyl, methylcyclohexyl, dimethylcyclohexyl, ethylcyclohexyl, etc. However, open-chain alkyl substituents give polymers having preferred properties.

The polymers have modified properties if the trimethylene glycol derivative contains other active groups or elements such as additional hydroxyls, carboxyls, carbonyls, halogens, sulfur, etc.

While the copolymers formed may be prepared from trimethylene glycol alone, or from a single trimethylene glycol derivative, copolymers having more than one variety of

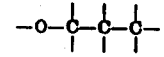

unit in addition to the

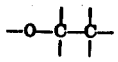

units also may be prepared in order to vary the properties of the polymer for a particular purpose. Thus, trimethylene glycol may be polymerized with one or more trimethylene glycol derivatives, or two or more trimethylene glycol derivatives in addition to the alpha, beta-dehydroxyglycol. While any proportions of the monomers may be employed in preparing the copolymeric materials, copolymers having greater than about 10 parts of one monomer to 1 part of the other (or others) show no substantial difference in properties from a polymer prepared from the first monomer alone. Therefore, it is a preferred practice, when preparing copolymers to use proportions of monomers from about 10:1 and about 1:1. Copolymers having monomer ratios of 5:1 and of 6:4, as well as 1:1, show well defined differences in properties from polymers prepared from any single trimethylene glycol or ethylene glycol monomer.

When $t$ in the general formula

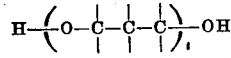

is more than 1, it preferably is from 2 to 5 but may be from 2 to 10 or even higher. Such glycols are the dimers, trimers, etc. of the monomeric trimethylene glycols. They include the lower polymers of single trimethylene glycols, or the lower copolymers of mixed trimethylene glycols.

The process of the present invention comprises the essential step of heating trimethylene glycol and/or its derivatives with alkylene glycols having hydroxyls on adjacent carbon atoms, defined hereinbefore, in the presence of certain catalysts. Since the mechanism of the polymerization appears to be one involving dehydration as an intermediate step, dehydration catalysts are employed. These include iodine, inorganic acids, such as halogen acids, sulfuric acid, and phosphoric acid, and organic acids, particularly sulfonic acids. Specific catalysts include hydrogen chloride, hydrogen bromide, hydrogen iodide, aromatic sulfonic acids such as para-toluenesulfonic acid, benzenesulfonic acid, acid acting salts such as alkali metal acid sulfates or phosphates, including sodium bisulfate, aluminium sulfate, potassium acid phosphate, etc.

The catalysts may be employed in solid, liquid or gaseous form, or may be present as a solution. Hydrogen iodide, for example is conveniently utilized in the present process as a concentrated aqueous solution, initially containing about 50% water. Others, such as the sulfonic acids, may be added as solids, liquids, or in either organic or aqueous solutions.

Dependent upon the nature of the monomer, the identity of the catalyst, the temperature of the polymerization reaction and the polymerization rate desired, the catalyst may be used in ratios with the monomer varying from about 1:500 to 1:10. Preferably, however, the ratio of catalyst is confined to the range from about 1:200 to 1:25, but a ratio of 1:100 gives satisfactory results in most circumstances.

The polymerization reaction may take place in either liquid, solution, emulsion, or gaseous phases. Hence, it is possible, and frequently even desirable to use either liquid or gaseous diluents, especially if active catalysts such as borontrifluoride or aluminum chloride are present. Liquid diluents may perform several functions by their presence, acting as solvents for the monomer and/or the polymer, as solvents for the catalyst, as azeotropic constituents for carrying off water formed during the polymerization, as diluents for the control of polymerization rate, or by their boiling points, as controls for the temperature of the reaction, as one phase of an emulsified reaction mixture, etc. Gaseous diluents are used primarily when the polymerization is carried out in gaseous phase, but also may be injected to carry off the water formed during polymerization, as coolants, etc.

Both gaseous and liquid diluents are preferably substantially inert toward the other components of the reaction mixture in the temperature range encountered prior to, during and after reaction. The most satisfactory diluents are hydrocarbons of either aromatic or aliphatic character, but preferably are saturated aliphatic hydrocarbons. When the diluent is to be used in an aqueous phase polymerization, it is preferably chosen from the group of hydrocarbons boiling between about 125° C. to about 300° C., especially if it is to be used in azeotropic distillation of water during polymerization. Hydrocarbons having boiling points within this range include the dihydronaphthalenes; cycloheptane, the decanes, including 2-methylnonane and 2,6-dimenthyloctane, the octanes, including 2,2,3-trimethylpentane and 2-methyl-3-ethylpentane, the nonanes, such as 2-methyloctane, 2,4-dimethylheptane, 4-ethylheptane, the dodecanes such as dihexyl or 2,4,5,7-tetramethyloctane, etc.

When the polymerization is carried out in gaseous phase, the diluent may be a lower hydrocarbon such as methane, ethane, propane, butane, etc. which act as regulators or diluents for the reaction, but which can be stripped from the product with facility, subsequent to the polymerization.

The proportion of diluent is not a critical factor in carrying out the process of the present invention. However, it is a preferred practice to keep the reaction mixture as concentrated as possible, consistent with maintaining homogeneity, rate of polymerization, etc. Ordinarily, when a diluent is used for a liquid phase polymerization the initial proportion of diluent to glycol is from about 1:1 to about 20:1, but preferably is initially from about 2:1 to about 5:1. When the temperature of the reaction is substantially below the boiling point of the diluent, this ratio will remain unchanged throughout the reaction. If, however, the conditions are such that water formed by dehydration of the glycols during polymerization distills with part of the diluent as an azeotrope, it is a preferred practice to arrange a return inlet so that the diluent passing over in the azeotrope may be replaced in or near the polymerization zone, so as to maintain a substantially constant diluent to glycol ratio.

Other ingredients may be included in the polymerization mixture, or may be added from time to time during the polymerization. For example, the polymerization may be carried out in a closed system, such as an autoclave. In such a case, the water formed in the polymerization may be effectively removed by the presence of dehydrating agents which will combine with or absorb the water as it is formed. Inert gases such as nitrogen may be added to protect the hot polymerization mass from oxidation. Reactants, such as alcohols, may be present for the purpose of converting the hydroxyl radicals normally present on both ends of the polymer chains to other functional groups, as more particularly set forth hereinafter.

The temperature of polymerization may vary within a relatively wide range; but, unless the reaction mixture is substantially above about 150° C. only a negligible amount of polymerization occurs, at least within a reasonable reaction period. If the reaction temperature is substantially above about 300° C., decomposition of the monomeric glycols and of the polymers takes place to such an extent that undue losses occur and the product requires extensive purification. The preferred polymerization temperature range is from about 170° C. to 225° C. with the optimum range being from about 175° C. to about 200° C. Trimethylene glycol boils at 214° C., and alkylated trimethylene glycols boil at somewhat higher temperatures, while ethylene glycol boils at 194° C. It is a preferred practice to conduct the polymerization at temperatures somewhat below the point at which the glycols will commence distilling; however if higher temperatures are employed, the apparatus may be arranged so as to return the distilled glycols to or near the polymerization zone.

When the polymerization is carried out by disposing all of the reactants in a vessel and heating with continuous or intermittent distillation of water, the reaction time required to obtain products having molecular weights of about 200 or more ordinarily is at least about 10 hours, and usually is about 24 hours or even longer. Under a given set of conditions, the molecular weight of the polymer varies directly with the amount of water formed, since a molecule of water is formed for every additional —O—C—C—C—, or —O—C—C— link added to the polymer chain. Consequently the average molecular weight of the polymeric product can be readily calculated by the amount of water which has been distilled out of the polymerization zone.

Subsequent to the polymerization period, the product usually is purified. The first step in purification is the removal of the catalyst. If this is a solid, suspended in the liquid polymer or a solution of the polymer, a simple filtration is all that is required. When the catalyst is in solution other methods must be employed. For example, when sulfonic acids are the catalysts used, a preferred means for their removal from the polymer comprises dissolving or thinning the polymer with an organic solvent such as benzene, washing with concentrated caustic to convert the acid to the sodium salt, and subsequently extracting with water to remove the sodium salts of the acids and any remaining traces of caustic.

After removal of the catalyst, the product may be dehydrated in order to remove the last traces of water formed during polymerization and any water remaining from catalyst extraction operations. Water may be removed by the use of dehydrating agents, or by distillation, preferably under subatmospheric pressure. If this latter method is employed, any solvents present and any monomeric glycols may be removed at the same time. Consequently, at the end of these operations there remains the copolymers, free of solvents, water and catalyst.

One phenomenon peculiar to the present copolymerization process is the production of color bodies which lower the quality of the product for some purposes. These color bodies are not soluble in the ordinary extraction media, such as organic solvents and hydrocarbon fractions. Furthermore, the removal of the color by means known to the art fails, when the copolymers are treated with the commonly known oxidizing agents, such as permanganate or peroxide. Other ordinary bleaching procedures heretofore utilized such as treatments with various activated carbons, activated aluminas, silica gels, or extraction with steam or toluene also fail to improve the color of the copolymers. All of these methods and agents readily decolorize glycerine, for example, but since they fail to improve the color of the subject polymers it is assumed that the color bodies are of a character not encountered heretofore.

However, in accordance with one phase of this invention, it has been found that a major portion of the color bodies may be removed by a combination treatment, comprising initially percolating the dehydrated polymer through Fuller's earth, and subsequently subjecting it to hydrogenation. By this combination treatment copolymers are obtained having a light yellow color, as compared with the dark brown or black masses initially obtained by the polymerization described.

Percolation through Fuller's earth is preferably carried out in an inert solvent, suitably a hydrocarbon such as benzene toluene xylene, etc. The percolation is preferably carried out at room temperature or below, but may be conducted at elevated temperatures, as long as the temperature and pressure adjustments are such as to prevent boiling of the solvent and consequent deposition of the polymer in the percolation tower. This percolation treatment results in the production of polymers having improved colors satisfactory for many purposes, in which case all that remains to be done is to flash off the solvent in order to recover the polymer.

On the other hand, polymers having the least color can be obtained only by following the percolation by hydrogenation. Neither percolation alone or hydrogenation alone, or any of the ordinary decolorizing or bleaching procedure results in the formation of light colored copolymers such as those obtained by treatment with Fuller's earth followed by hydrogenation.

In carrying out the percolation through Fuller's earth, oxygen-containing solvents such as acetone, methyl alcohol and dioxane are relatively ineffective for aiding in the removal of color from the subject polymers. The color removal appears to be specific in that hydrocarbon solvents, and especially aromatic hydrocarbon solvents are required, benzene and toluene giving the best results.

The hydrogenation step is essential for the reduction of color-sensitive functional groups, supposedly carboxylic in character. Raney nickel, nickel sulfide, copper, palladium, platinum, and other catalysts suitable for the reduction of carbonyls may be used, although Raney nickel is preferred. Temperatures employed vary from about 125° to about 250° C., and hydrogen pressures from about 500 to about 3,000 lb. per square inch are utilized. Subsequent to hydrogenation the catalyst may be removed from the product; e. g. by super-centrifuging or filtration and any solvents present may be flashed off to yield the light yellow copolymers or substituted trimethylene glycols.

The copolymers formed from the glycols described hereinbefore have hydroxyl groups on both ends of each polymer chain. These hydroxyls may be acted upon by the usual methods with such materials as etherifying or esterifying agents in order to obtain products having altered properties, such as solubility or improved action as lubricants, plasticizers, etc.

Various etherifying agents may be used for etherifying the terminal hydroxyls. These include alkyl halides, such as methyl iodide, methyl bromide, ethyl chloride, propyl iodide; aralkyl halides such as benzyl chloride and methyl benzyl chloride; carboxyalkylating agents such as sodium monochloracetate; and alkylene halides such as allyl chloride, also dimethylsulfate, diethylsulfate. Ordinarily, the etherification is carried out in strongly basic environments; sodium hydroxide, liquid ammonia and quaternary ammonium bases and salts being the usual basic substances present.

Esterification of the terminal hydroxyls may be accomplished with various inorganic groups such as nitrates, phosphates or sulfates. However, preferred esterifying agents are the organic acids anhydrides or acid chlorides, and especially fatty acids, acid anhydrides and their chlorides, including for example, formic, acetic, propionic, butyric, hexoic, 2-ethylhexoic, and higher fatty acids, such as lauric, stearic, myristic, palmitic and capric acids. Usually the esters are formed by treatment of the hydroxylated polymer with the anhydride of the acid in the presence of a catalyst such as sulfuric or phosphoric acid. The saturated fatty acids form the most stable esters with the copolymers.

At times it is preferable to allow only partial etherification, thus forming half-ethers or half-esters instead of the di-ethers or di-esters theoretically possible. For other purposes the end-group hydroxyls may not only be partially or completely esterified or etherified, but also may be treated so as to result in the formation of mixed ethers, mixed esters or ether-esters.

Etherification or esterification of the end-groups may take place simultaneously with or subsequent to polymerization, and may be effected prior to or subsequent to the decolorizing and purifying processes described hereinbefore. Preferably, the end-group modification is carried out immediately after polymerization and before purification or decolorizing, but a secondary preferred time for modification is during the polymerization step itself.

In carrying out this latter step the exact mechanism by which substitution of the end groups occur is obscure. However, it has been discovered, in accordance with this invention, that by using an active modifying agent, such as an alcohol, as the diluent during the polymerization, reaction occurs to give polymers having at least one substituted end group, such as an ether group or ester group. For example, if alcohols such as n-octyl alcohol, n-decyl alcohol, n-dodecyl alcohol, etc., or their homologs, analogs or isomers, are used as diluents during polymerization, the corresponding ethers of the polymers are formed. Since this provides a convenient method for modifying the properties of the polymer, it is preferred that the alcoholic diluent or other modifying agent, have from about 6 to about 20 carbon atoms. The reactive diluent may be the only diluent present or may be mixed with one or more inert diluents.

The copolymers comprising the lubricants of the present invention have the general configuration

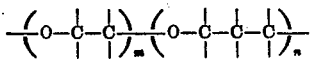

wherein $m$ and $n$ are integers. The indicated unsatisfied valences of the carbon atoms may link either hydrogen or organic radicals to the polymer. Preferably the substituents are either hydrogen or hydrocarbon radicals. Stability is promoted within the molecule if the substituents are either hydrogen or saturated aliphatic radicals, especially the lower alkyl radicals. However, the substituents may be unsaturated hydrocarbon radicals, or they may contain non-hydrocarbon components, especially oxygen, sulfur, selenium, tellurium, phosphorus or nitrogen.

Thus, when trimethylene glycol is copolymerized with an alkylene glycol having hydroxyls on adjacent carbon atoms, the polymer will consist essentially of units having the general configuration:

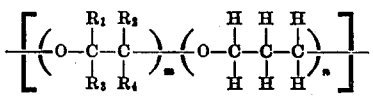

wherein $m$ and $n$ are integers and $R_1$ through $R_4$ are hydrogens or organic radicals. A specific example of such a polymer would be the copolymer of ethylene glycol and trimethylene glycol, copolymerized in equimolecular quantities, so as to give the chains having units as follows:

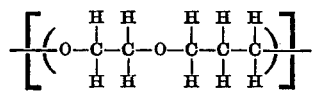

Copolymers formed according to the present invention include those of ethylene glycol and trimethylene glycol; ethylene glycol and 1-methylpropanediol-1,3; ethylene glycol and 2-methylpropanediol-1,3; ethylene glycol and 2,2-dimethylpropanediol-1,3; ethylene glycol and 1,2-diethylpropanediol-1,3; 1,2-di-methylethylene glycol and trimethylene glycol; 1,2-dimethylethylene glycol and 1,3-dibutylpropanediol-1,3, etc.

When the end-groups of the polymer have not been modified, the copolymers of this invention will have the general formula:

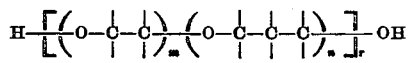

where $m$, $n$, and $r$ are integers. If the end groups have been subjected for example, to etherification or esterification, the general formulas of the derivatives

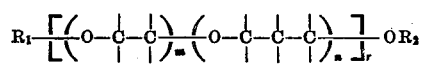

wherein $R_1$ and $R_2$ are hydrogens, alkyl groups, or acyl groups, and $m$, $n$ and $r$ are integers. Polymers of the above general configuration having the greatest utility are those in which the balance of carbon valences are satisfied with hydrogens or lower alkyl groups. The polymers most preferred are those in which each

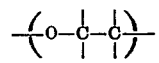

unit has at least three of the carbon valences satisfied with hydrogens and in which each

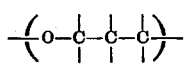

unit has at least four of the carbon valences satisfied with hydrogens.

The copolymers of the present invention are especially suitable for lubricating purposes such as in engine lubricants, hydraulic brake fluids, instrument oils, stand-by oils, grease bases, but also may be used as plasticizers for nitrocellulose, cellulose ethers, cellulose esters, methacrylate polymers, phenol-formaldehyde resins, etc. The compatibility of the subject copolymers with resins or cellulose derivatives is controlled by the molecular weight of the copolymer, the identity of the monomer or monomers from which it is made, and the modification of the end-groups. For instance, the combination of the copolymers and methacrylate polymers generally results in an incompatible mixture of the components. However, by etherifying at least one of the end-group hydroxyls of the copolymers with a long chain alcohol, such as n-decanol, the polymer then can be mixed with a methacrylate polymer, such as polylauryl methacrylate, in substantially any proportions to give lubricating compositions of high viscosity and very high viscosity index.

The products of the present invention vary from thin liquids to viscous oils, and, if the molecular weight is great enough, products which are gels or solids at room temperature are formed. The trimethylene glycol polymers may be of any molecular weight dependent at least in part upon the extent to which the intermediate glycolic dehydration is carried. Polymers having molecular weights from about 100 to about 10,000 are readily prepared, but those having molecular weights between about 200 and 1500 are preferred, since they have properties of viscosity and solubility which give them extensive utility.

Copolymers having molecular weights below about 200 are generally water-soluble, or at least swell in water. Those having higher molecular weights are soluble in the usual organic solvents, such as aromatic hydrocarbons, esters, ethers and alcohols. The solubility of the polymer varies with a) molecular weight; b) identity of the monomer; and c) end-group modification. If, the copolymer, and especially those having molecular weights below about 1100, have end-groups of substantial size, such as a n-decyl ether group, the properties such as solubility, etc., may be substantially modified.

When the molecular weight of the copolymer is less than about 1,500, the freezing points thereof may be as low as −75° C. or lower. For a given molecular weight, and a given combination of monomers, the pour point usually will decrease as the proportion of trimethylene glycol monomer is diminished.

The present copolymers have viscosity characteristics which make them useful as lubricants. Copolymers having molecular weights between about 200 and about 1500 have viscosities from about 30 to about 300 centistokes at 100° F., and from about 4.5 to about 40 at 210° F. These viscosities correspond to lubricating oils having S. A. E. numbers from about 10 to about 80.

Another important viscosity characteristic possessed by the subject copolymers is their excellent viscosity indices. Dependent upon the three variables of molecular weight, monomer identity, and end-group modification, the viscosity index may be varied from about 100 to 165 or even higher. Accordingly, while the viscosity index of a copolymer having a molecular weight of about 300 is about 113, a similar copolymer having a molecular weight of about 1000 has a viscosity index of about 136. Again, by acetylating the end groups of a copolymer having an original viscosity index of 124, the viscosity index is raised to 165.

The subject copolymers are primarily useful for lubrication and/or metal protection purposes, since they have excellent oxidation stability, have low pour points and leave substantially no engine deposits. Their stability against oxidation is outstanding, especially in comparison with polymers comprising the chains

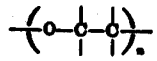

Furthermore, the presence of

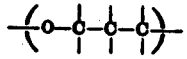

units in the polymer chain, together with the units

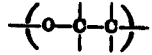

imparts special sensitivity to the presence of antioxidants of the substituted phenol and substituted aromatic amine types.

The oxidation stability of ethylene glycol-trimethylene glycol copolymers is outstanding, especially in comparison with other polymers containing ether linkages, such as polymers of propylene oxide for example. Both uninhibited polymers, and polymers stabilized with phenyl-alpha-naphthylamine are compared in Table I, below. A 50 cc. sample of each polymer was subjected to an initial oxygen pressure of 50 lbs. per sq. inch, at a temperature of 140° C. in the presence of 1 square cm. copper per gram of polymer. The time required for oxidation of the polymer is indicated by the 10 and 20 pound oxygen pressure drops.

TABLE I

Oxidation Stability

| Polymer | Per Cent Stabilizer | Stability time, Hours | |
|---|---|---|---|
| | | 10 lb. drop | 20 lb. drop |
| Propylene oxide polymer | 0 | 1.3 | 2.1 |
| Do | 1 | 13.0 | 21.5 |
| 50:50 copolymer of trimethylene glycol and diethylene glycol | 0 | 15 | 28 |
| 50:50 copolymer of trimethylene glycol and diethylene glycol | 1 | 66 | more than 100 |

Other aromatic amines having a stabilizing effect upon the copolymers of the present invention include n-alkylated para-phenylenediamines and the polynuclear aromatic amines, such as n - butyl - para - phenylenediamine, n,n'-dibutyl-para-phenylenediamine, alpha- and beta-naphthylamine, phenyl-beta-naphthylamine, alpha, alpha-, beta,beta-, or alpha,beta-dinaphthylamine, etc. Substituted phenols which provide satisfactory stability include petroleum alkyl phenols, 2,4-di-tert-butyl-6-methylphenol, pentamethylphenol, etc., as well as their homologs and analogs. The present copolymers act as excellent engine lubricants, being subject to little change in molecular weight, and maintaining engines in a clean condition. Table II below illustrates the performance of a 60:40 copolymer of trimethylene glycol and diethylene glycol having an initial molecular weight of 460. The copolymer was tested for 40 hours in a Lauson engine.

TABLE II

| | Before Test | After Test |
|---|---|---|
| Viscosity, Centistokes, 100° F | 70.0 | 61.5 |
| Viscosity, Centistokes, 210° F | 10.6 | 11.9 |
| Viscosity Index | 133 | 133 |

The engine at the end of the test had only a light deposit of lacquer on the crown and a light deposit in the oil sump, while the ring belt was clean.

Having described the general characteristics, preparation, properties and use of the subject copolymers, examples are presented illustrating specific embodiments of the invention, especially of the copolymerization process and of the copolymers so formed:

Example I

*Copolymerization of trimethylene glycol and diethylene glycol*

Eighty parts trimethylene glycol and 20 parts diethylene glycol, together with 2 parts hydrogen iodide, 50% aqueous solution, were placed in a reaction kettle attached directly to a still which provided a full takeoff of water with substantially no reflux. The reaction mixture was heated between 175 and 200° C. for a number of hours. Heating was discontinued and the reaction mixture cooled and dissolved in benzene. The resulting solution was washed with 48 Bé. caustic and water, after which the solvent was flashed off. The brown, oily product was dried by heating at 100° C. under 1-2 mm. Hg. pressure. The product, which was a copolymer of trimethylene glycol and diethylene glycol, had the following properties: molecular weight: 700; centistokes viscosity at 100° F.: 99.1; centistokes viscosity at 210° F.: 15.0; viscosity index: 138; freezing point: −15° C.

Example II

*Copolymerization of trimethylene glycol and diethylene glycol*

Sixty parts trimethylene glycol, 40 parts diethylene glycol, and 4 parts para-toluenesulfonic acid were heated together as described in Example I, using decalin as an azeotroping diluent. The initial ratio of decalin to glycols was about 1:1. Purification of the polymer was conducted as described in Example I. The brown copolymer had a molecular weight of 595; centistokes viscosity at 100° F.: 58.2; centistokes viscosity at at 210° F.: 20; freezing point was lower than −75° C.; and viscosity index: 130.

Example III

*Copolymerization of trimethylene glycol and triethylene glycol*

Sixty parts trimethylene glycol and 40 parts triethylene glycol were polymerized as described in Example I. The product had a molecular weight of 570; centistokes viscosity at 100° F.; 87.2; centistokes viscosity at 210° F.; 13.0; and viscosity index 135.

Example IV

*Acetylation of trimethylene glycol-diethylene glycol copolymer*

Trimethylene glycol and diethylene glycol were polymerized as described in Example II. The reaction mass was dissolved in 200 parts benzene. 100 parts acetic anhydride was added, and the mixture refluxed for 8 hours. The solution was extracted 4 times with water, and the acetylated polymer was recovered by removal of benzene and drying at 100° C. under 1-2 mm. Hg. pressure. The product had a molecular weight of 650, a viscosity index of 165, and a freezing point of less than −75° C.

Example V

*Preparation of 2-ethylhexoate of trimethylene glycol-diethylene glycol copolymer*

A polymerization reaction mixture was heated as described in Example II. After polymerization, the mixture was diluted with 200 parts benzene, 65 parts 2-ethylhexoic acid was added, and the mixture was refluxed under a separating still head until no further distillation of water took place. The residue was washed with water 4 times. The polymer was recovered by flashing off solvent and drying at 100° C. under 1-2 mm. Hg. pressure. The product had a molecular weight of 800, a viscosity index of 150; and a freezing point of less than −75° C.

Example VI

*Decolorization of the copolymer of trimethylene glycol and diethylene glycol*

Trimethylene glycol and diethylene glycol were polymerized and the polymer purified as described in Example I. One part of the brown polymer was dissolved in 2 parts benzene and percolated through a column filled with Fuller's earth. By this treatment the polymer's color was improved from brown to a Gardner color of 13.

Example VII

*Hydrogenation of the copolymers of trimethylene glycol and diethylene glycol*

The decolorized polymer obtained by filtration through Fuller's earth as described in Example VI was hydrogenated at 125° C. in the presence of Raney nickel using 1500 pounds hydrogen pressure. The product obtained had a Gardner color of 6.

We claim as our invention:

1. A new composition of matter comprising a mixture of copolymers having the general formula

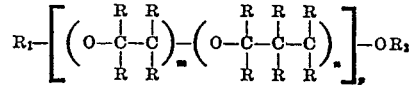

wherein $m$, $n$ and $p$ are positive integers, $R_1$ and $R_2$ are substituents of the group consisting of hydrogen atoms, carboxylic acid acyl radicals 1-17 carbon atoms and alkyl radicals having 1-3 carbon atoms; each R being a substituent of the group consisting of hydrogen atoms and alkyl groups having 110 carbon atoms, said copolymers having an average viscosity from about 30 to 300 centistokes at 100° F. and an average molecular weight between about 200 and 1500.

2. A lubricating composition according to claim 1 wherein at least 4 of the R's in the group

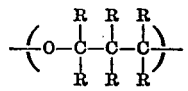

are hydrogens.

3. A lubricating composition according to claim 1, wherein at least 2 R's of the group

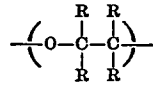

are hydrogens.

4. A lubricating composition of matter comprising a mixture of copolymers having the general formula

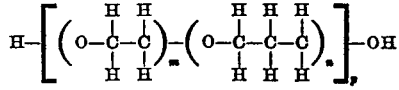

wherein $m$, $n$ and $p$ are positive integers, said copolymers having an average viscosity from about 30 to 300 centistokes at 100° F. and an average molecular weight between about 200 and 1500.

SEAVER AMES BALLARD.
RUPERT CLARKE MORRIS.
JOHN L. VAN WINKLE.

REFERENCES CITED

The following references are of record in the file of this patent:

UNITED STATES PATENTS

| Number | Name | Date |
|---|---|---|
| 1,984,421 | Muench et al. | Dec. 18, 1934 |
| 2,089,569 | Orthner | Aug. 10, 1937 |
| 2,146,323 | Zellhoefer | Feb. 7, 1939 |
| 2,146,324 | Zellhoefer | Feb. 7, 1939 |
| 2,258,892 | Harris | Oct. 14, 1941 |
| 2,383,915 | Morgan | Aug. 28, 1945 |
| 2,425,755 | Roberts | Aug. 19, 1947 |
| 2,425,845 | Toussaint | Aug. 19, 1947 |
| 2,434,978 | Zisman | Jan. 27, 1948 |

FOREIGN PATENTS

| Number | Country | Date |
|---|---|---|
| 425,728 | Great Britain | Mar. 20, 1935 |

Certificate of Correction

Patent No. 2,481,278                                                                 September 6, 1949

SEAVER AMES BALLARD ET AL.

It is hereby certified that errors appear in the printed specification of the above numbered patent requiring correction as follows:

Column 14, line 47, after the word "radicals" insert *having*; line 51, for "110 carbon atoms" read *1–10 carbon atoms*; line 69, strike out "lubricating" and insert *new*;

and that the said Letters Patent should be read with these corrections therein that the same may conform to the record of the case in the Patent Office.

Signed and sealed this 14th day of February, A. D. 1950.

[SEAL]

THOMAS F. MURPHY,
*Assistant Commissioner of Patents.*